United States Patent [19]

Aoki

[11] Patent Number: 4,813,301
[45] Date of Patent: Mar. 21, 1989

[54] AUTOMATIC TRANSMISSION

[75] Inventor: Hideyuki Aoki, Anjo, Japan

[73] Assignee: Aisin-Warner Kabushiki Kaisha, Anjo, Japan

[21] Appl. No.: 83,495

[22] Filed: Aug. 6, 1987

[30] Foreign Application Priority Data

Aug. 11, 1986 [JP] Japan .................................. 61-188228

[51] Int. Cl.$^4$ ............................................. F16H 57/10
[52] U.S. Cl. ........................................... 74/762; 74/760
[58] Field of Search ................... 74/760, 762, 720, 718

[56] References Cited

U.S. PATENT DOCUMENTS

| | | | |
|---|---|---|---|
| 3,088,339 | 5/1963 | Black | 74/760 X |
| 3,486,398 | 12/1969 | Waclawek | 74/730 X |
| 4,331,044 | 5/1982 | Bookout et al. | 74/762 X |
| 4,546,672 | 10/1985 | Leboime | 74/760 X |
| 4,602,522 | 7/1986 | Dorpmund | 74/762 X |
| 4,660,439 | 4/1987 | Hiraiwa | 74/762 X |

Primary Examiner—Dirk Wright
Attorney, Agent, or Firm—Frank J. Jordan; C. Bruce Hamburg; Manabu Kanesaka

[57] ABSTRACT

In an automatic transmission including a torque converter, the transmission mechanism is capable of performing lock-up function. The input side portion of a first clutch is coupled with the turbine of the torque converter, wherein the first clutch is in connection while the automatic transmission mechanism is in forward one, forward two and forward three speed, respectively. The input side portion of a third clutch is coupled with the impeller of the torque converter, wherein the third clutch is in cut-off during forward one and two speed and in connection during high speed stages (three speed and four speed, for instance).

Thus, in low speed states (one speed and two speed), the torque is transferred through the oil flow of the torque converter, and in high speed states (three speed and four speed), the torque which is machanically coupled with the engine output shaft is transfered to the automatic transmission mechanism.

4 Claims, 2 Drawing Sheets

|  | $C_1$ | $C_2$ | $C_0$ | $B_1$ | $B_2$ | $B_3$ | $F_1$ | $F_2$ | $F_0$ |
|---|---|---|---|---|---|---|---|---|---|
| 1ST | ○ |  |  |  |  | △ | ○ |  |  |
| 2ND | ○ |  |  | △ | ○ |  | ○ |  |  |
| 3RD | ○ |  | ○ |  | ○ |  |  |  | ○ |
| 4TH |  |  | ○ | ○ | ○ |  |  |  |  |
| REV |  | ○ |  |  |  | ○ |  |  |  |

|  | $C_1$ | $C_2$ | $C_0$ | $B_1$ | $B_2$ | $B_3$ | $F_1$ | $F_2$ | $F_0$ |
|---|---|---|---|---|---|---|---|---|---|
| 1ST | ○ |  |  |  |  | △ |  | ○ |  |
| 2ND | ○ |  |  | △ | ○ |  | ○ |  |  |
| 3RD | ○ |  | ○ |  | ○ |  |  |  | ○ |
| 4TH |  |  | ○ | ○ | ○ |  |  |  |  |
| REV |  | ○ |  |  |  | ○ |  |  |  |

AUTOMATIC TRANSMISSION

BACKGROUND OF THE INVENTION

1. Field of the Invention

This invention relates to an automatic transmission, particularly to an automatic transmission for an automobile which is used together with a torque converter, and more particularly to an automatic transmission capable of performing lock-up clutch function.

2. Description of the Prior Art

In general, an automatic transmission mechanism comprises a plurality of planetary gear units, an element of which is connected with an input member by a clutch and locked by a brake or a one-way clutch to provide forward three speed or forward four speed transmission stages.

With a recently proposed automatic transmission, a lock-up clutch is arranged in a torque converter disposed between an engine output shaft and the input shaft of the above-mentioned automatic transmission mechanism, wherein the output shaft and the automatic transmission mechanism are mechanically coupled by the lock-up clutch in transmission stage higher than a certain transmission stage, particularly in the highest stage (overdrive), providing an elimination of power loss caused by the torque converter and an improvement of fuel efficiency.

However, with the above-mentioned automatic transmission, since the lock-up clutch is incorporated in the torque converter, the dimension along the axis expands that much longer. In a recent growing tendency that small-sized structures are in demand for F.F (front-engine and front-drive) design or the like, said longer structure leads to problems such as limitation of flexibility associated with loading on vehicles, need of particular regulation for lock-up clutch and complicated structure of hydraulic control mechanism.

Further, since a lock-up clutch incorporated in a torque converter consists of a single plate clutch to be switched depending on oil flow direction, it has less torque transfer capacity and a lower reliability in comparison with a multi-plate clutch to be regulated by a hydrauric servomechanism comprising a cylinder means.

SUMMARY OF THE INVENTION

It is therefore an object of the present invention to provide an automatic transmission comprising a lock-up clutch which is incorporated in the automatic transmission mechanism of the automatic transmission to solve the above-mentioned problems.

The present invention is proposed under the aforesaid circumstances. Referring to FIG. 1, for instance, an automatic transmission (10) in accordance with the present invention comprises a torque converter having an impeller (2a) communicated with the engine output shaft; a torque converter (2) having a turbine (2b) and a reactor (2c) which are communicated with an input member (5) of an automatic transmission mechanism (3); and another automatic transmission mechanism (9) having a plurality of gear units (6),(7), wherein the automatic transmission mechanism (9) has at least forward three speed stages (four speed stages, for instance) and comprises at least a first clutch ($C_1$) and a third clutch ($C_1$),($C_0$) each of which consists of a multi-plate clutch regulated by a hydraulic servo mechanism. And the present invention is characterized in that the first clutch ($C_1$) is put into connection in forward one speed, two speed and three speed, respectively (if four speed is equipped, the clutch ($C_1$) is in cut-off); the third clutch ($C_0$) is put into cut-off in one speed and two speed, respectively and into connection in high speed stages (three speed and four speed, for instance); the input part of said first clutch ($C_1$) is coupled with the input member (5) from said turbine; and the input part of said third clutch ($C_0$) is coupled with a member (12) connected with said impeller (2a) directly.

According to this arrangement, in forward one speed and two speed, the first clutch ($C_1$) is in connection and the rotation of the engine output shaft is transferred to the input member (5) through the torque converter (2), namely, the rotation of the impeller (2a) produces an oil flow which is received, via the reactor (2c), by the turbine (2b) with which the input member (5) is coupled; and the rotation of the input member (5) is transferred to an element (ring gear $R_1$) of the gear unit (6); and further, some elements are kept locked to provide a desired rotation.

Next, in high speed stages (three speed and four speed; overdrive), the third clutch ($C_0$) is in connection and the rotation given by the mechanical coupling with the engine output shaft is directly transferred to an appropriate element ($R_2$) of the automatic transmission mechanism (9).

It should be noted that the foregoing reference characters are only for correspondence with FIG. 1 and are not intended to limit the scope of the present invention.

DESCRIPTION OF THE PREFERRED EMBODIMENT

Now, embodiments of the present invention are described.

Figures 1, 2:
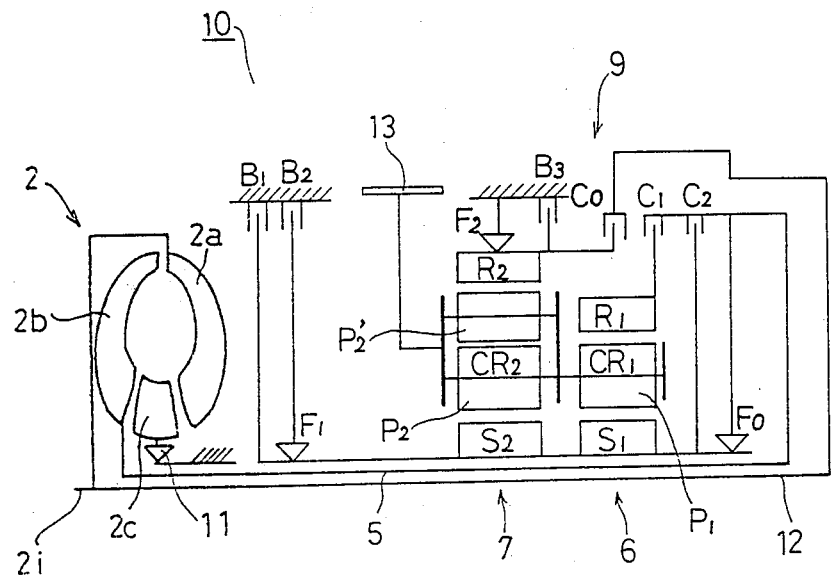
FIG. 1 is a schematic view of an automatic transmission as an embodiment of the present invention.
FIG. 2 is a table illustrating the operation state of its respective elements.

As shown in FIG. 1, an automatic transmission 10 comprises a torque converter 2, four speed automatic transmission mechanism 9 and, in some cases not shown, an underdrive mechanism and a differential mechanism.

The torque converter 2 includes an impeller 2a coupled with the engine output shaft, a turbin 2b coupled with the input shaft of the automatic transmission mechanism 9 and a reactor 2c, the rotation in one direction of which is restricted by a one-way clutch 11, wherein the impeller 2a produces an oil flow which is received by the turbine 2b via the reactor 2c to transfer the rotation.

The four speed automatic transmission mechanism 9 comprises a single planetary gear unit 6 which includes a sun gear $S_1$, ring gear $R_1$ and a carrier $CR_1$ to support a one-layer pinion and a dual planetary gear unit 7 which includes a sun gear $S_2$, a ring gear $R_2$ and a carrier $CR_2$ to support a two-layer pinion $P_2,P_2'$ engaging with respect to each other, wherein the respective carriers $CR_1,CR_2$ (CR, hereafter) of the planetary gear units are integrally coupled with respect to each other, and in the same way, respective sun gears $S_1,S_2$ (S, hereafter)

of the planetary gear units are integrally coupled with respect to each other. Here, a common sun gear may be used for the both planetary gear units 6, 7 and a long pinion may be used as both the first pinion $P_2$ engaging with the sun gear $S_2$ of the dual unit 7 and the pinion $P_1$ of the single unit 6. The input shaft 5 from the turbine $2b$ of the torque converter 2 is coupled with the ring gear $R_1$ of the single planetary gear unit 6 through the first (forward) clutch $C_1$, and also, is coupled with the sun gear S through the second (direct) clutch $C_2$. The sun gear S is restricted directly by the first (2nd coast) brake $B_1$, and also, is restricted as to rotation in one direction by the second (2nd) brake $B_2$ through the first one-way clutch. And besides, the ring gear $R_2$ of the dual planetary gear unit 7 is restricted directly by the third (1st & Rev) brake $B_3$, and also, is restricted as to rotation in one direction by the second one-way clutch $F_2$. And the shaft 12 coupled with the input shaft $2i$ of the torque converter 2, consequently coupled with the impeller $2a$, is also coupled with the ring gear $R_2$ of the dual planetary gear unit 7 through the third (overdrive) clutch $C_0$. A third one-way clutch $F_0$ is disposed between the input shaft 5 and the sun gear S to so regulate the rotation of the sun gear as not to exceed that of the input shaft 5. As to the carrier CR, it is coupled with the counterdrive gear 13 which serves as the output member of the four speed automatic transmission mechanism 10.

By the way, said first, second and third clutches $C_1$–$C_3$ consist of multi-plate clutches, respectively, in the same way as conventional ones of such a type, and are operated by a hydraulic servo mechanism including a cylinder means and a piston means. And besides, the first and second clutches $C_1,C_2$ are coupled with a shaft in an operative connection with the input shaft 5 of the automatic transmission mechanism 9, namely, with the turbine $2b$ of the torque converter 2, at the input side portion of the clutches. In a similar way, the third clutch $C_0$ is coupled with another shaft 12 directly coupled with the impeller $2a$ of the torque converter 2, namely, is coupled with the input shaft $2i$ of the torque converter, at the input side portion.

In the next place, the operation process of this embodiment is described hereafter by referring to FIG. 2.

In the one speed state (1st) in D range, the first (forward) clutch $C_1$ is connected, with the result that the rotation of input shaft 5 transferred through the torque converter 2 is transferred to the ring gear $R_1$ of the single unit 6 through the first clutch $C_1$. In this state, the rotation of the ring gear $R_2$ of the dual unit 7 is kept blocked by the second one-way clutch $F_2$, resulting in a great reductive rotation of the common carrier CR in the positive direction with a reverse racing of the sun gear S, and said reductive rotation is output from the counterdrive gear 13 and further is transferred to the axle through the differential mechanism or the like. On the other hand, in L range, the third brake $B_3$ also works to so stop the ring gear $R_2$ as to cancel the racing of the second one-way clutch during coasting of the engine brake or the like, thereby holding the one speed state.

Next, in the two speed state (2ND) in D range, the second (2nd) brake $B_2$ works in addition to the connection of the first clutch $C_1$, with the result that the rotation of the sun gear S is stopped by the first one-way clutch $F_1$ operated according to the brake $B_2$, and consequently, the rotation of the input shaft 5 through the torque converter 2 is transferred to the ring gear $R_1$ through the first clutch $C_1$, thereby causing the carrier to rotate reductively in the positive direction as racing the ring gear $R_2$ of the dual unit 7 in the positive direction, wherein said reductive rotation is transferred to the counterdrive gear 13. Here, in 2 range, the first brake $B_1$ works during coasting and stops the sun gear S directly in order to block the rotation of the sun gear S that would be caused by the racing of the first one-way clutch $F_1$.

And further, in the three speed state (3RD), the third clutch $C_0$ is put into connection in addition to the working of the first (forward) clutch $C_1$ and the second brake, with the result that the rotation of the input shaft 5 received through the torque converter 2 is transferred to the ring gear $R_1$ of the single unit 6 through the first clutch $C_1$, and at the same time, the direct rotation received from the torque converter input shaft $2i$ through the shaft 12 is transferred to the ring gear $R_2$ of the dual gear unit 7 through the third clutch $C_0$, thereby causing respective elements of the both planetary gear units 6,7 to rotate integrally and further transferring the rotation to the counterdrive gear 13 through the carrier CR. That is, in said three speed state, the rotation of the engine output shaft is in a mechanical direct connection through shaft 12, this situation being so-called on-state of lock-up clutch.

Still further, in the four speed state (4TH; overdrive) in D range, the first clutch $C_1$ is released from the three speed state, and at the same time, the first brake $B_1$ works, with the result that the rotation of the shaft 12 to which the rotation of the input shaft $2i$ of the torque converter 2 is directly transferred is transferred to the ring gear $R_2$ of the dual unit 7 through the third clutch $C_0$. In this state, since the sun gear S is stopped, the carrier CR rotates at a high speed as racing the ring gear $R_1$ of the single unit 6 at an increasing speed, thereby transfering said high speed rotation to the counterdrive gear 13 as overdrive (O/D). That is, in the four speed state, the rotation of the engine output shaft is mechanically and directly coupled with the automatic transmission mechanism 9 and transferred thereto without through any oil flow of the torque converter 2, the lock-up clutch being in the on-state.

By the way, although the release of the clutch $C_1$ proceeds the actuation of the first brake $B_1$ when the up-shift from three speed to four speed is performed, the third one-way clutch $F_0$ prevents the sun gear S from running out of control in the increasing speed direction, thereby easing the operation timing of the first clutch $C_1$ and the first brake $B_1$, and also, eliminating shift shocks due to the changing in coupling relation to provide a smooth shifting. In a similar way, when down-shifting from four speed to three speed, the release of the first brake $B_1$ prevents the sun gear S from rotating at a speed higher than that of the input member 5, thereby providing a smooth shifting.

Still further, in reverse (R) range, the second clutch $C_2$ is put into connection and the third brake $B_3$ works, with the result that the rotation of the input shaft 5 is transferred to the sun gear S through the clutch $C_2$. Here, in this state, since the ring gear $R_2$ of the dual unit 7 is fixed due to the working of the third brake $B_3$, the carrier CR is rotating reversely as the ring gear $R_1$ of the single unit 6 is also rotating reversely, this reverse rotation being transferred to the counterdrive gear 13.

Figures 3, 4:
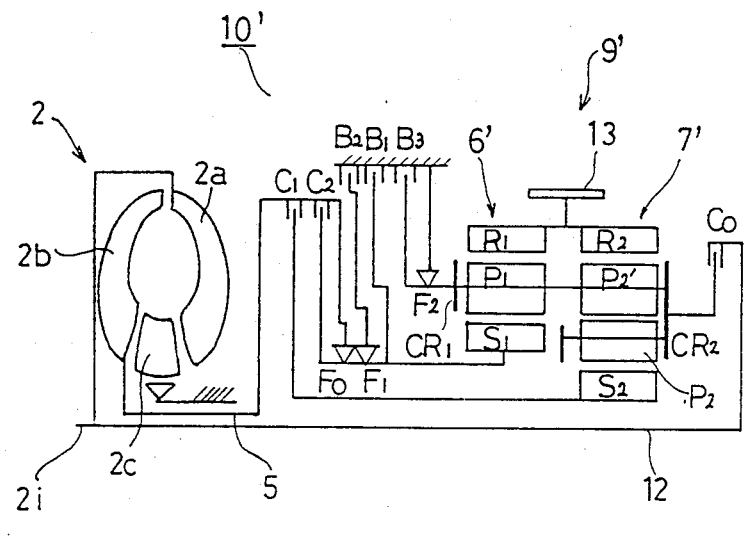
FIG. 3 is a schematic view of an automatic transmission as another embodiment of the present invention.
FIG. 4 is a table illustrating the operation state of its respective elements.

Now hereafter, another embodiment is described by referring to FIG. 3 and FIG. 4, wherein the foregoing embodiment is partially modified.

An automatic transmission 10' in this embodiment comprises a torque converter 2 and a four speed automatic transmission mechanism 9'. The four speed automatic transmission mechanism 9' includes a single planetary gear unit 6' and a dual planetary gear unit 7', wherein the respective ring gears $R_1, R_2$ of these gear units 6',7' are integrally coupled with respect to each other, and also, the respective carriers $CR_1, CR_2$ of the gear units are integrally coupled with respect to each other. The input shaft 5 interlocked with the turbine $2b$ of the torque converter 2 is coupled with the sun gear $S_2$ of the dual unit 7' through the first clutch $C_1$, and at the same time, is coupled with the sun gear $S_1$ of the single unit 6' through the second clutch $C_2$ or the third one-way clutch $F_0$. On the other hand, the shaft 12 connected directly with the input shaft $2i$ of the torque converter 2 is coupled with the carriers $CR_1, CR_2$ through the third clutch $C_0$ and the output member 13 is coupled with said integrally coupled ring gears $R_1, R_2$.

Thus, as illustrated in the operation table in FIG. 4, the automatic transmission 10' realizes one speed-four speed (1ST-4TH) and reverse-going (Rev) on the basis of the combined operations of respective clutches $C_1, C_2, C_0$, respective brakes $B_1, B_2, B_3$ and respective one-way clutches $F_1, F_2, F_0$. In the table, symbol means engagement of clutch and working of brake and one-way clutch; another symbol $\Delta$ means working only during coast. That is, in one speed, two speed and reverse, the rotation of the input shaft 5 through an oil flow of the torque converter 2 is transferred to the automatic transmission mechanism 9' through the first or second clutch $C_1, C_2$ to provide a desired transmission stage. On the other hand, in three speed and four speed (overdrive), the rotation directly coupled with the torque converter input shaft $2i$ is transferred to the automatic transmission mechanism 9' through the third clutch $C_0$, thereby providing an overdrive rotation with the on-state of lock-up clutch.

As described above, according to the present invention, when the automatic transmission mechanism 9,9' is set at a high speed stage, the direct connection state without utilizing the torque converter is realized automatically, because the third clutch $C_0$ in the connection state with a high speed stage is coupled with the impeller $2a$ of the torque converter 2. Thus, no lock-up clutch of a special type is required. This leads to advantages such that the automatic transmission 10,10' can be shortened as to the size along the axis and can well cope with a growing demand for small loading space in vehicles due to F.F designs or other reasons, and besides, no complicated control mechanism is required, resulting in a lower cost.

Particularly, if the automatic mechanism 9,9' is of forward four speed, the third clutch $C_0$ which is indispensable for four speed can be used as a lock-up clutch means with no modification, providing another great advantage.

Further saying, an increase in torque transfer capacity and an improvement in reliability are obtained, because the third clutch $C_0$ which additionally performs a lock-up clutch function consists of a multi-plate clutch and is regulated by a hydraulic servo mechanism.

Still further, the present invention can cope with a recent growing tendency of high power vehicles by employing the following arrangement in which a small tangential force acting on the gear surfaces provides a great maximum permissible input torque with neither large gear width nor great locking means capacity, because inputting is performed to ring gears $R_1, R_2$ except during reverse going.

Namely, this advantage is obtained by such arrangement that the automatic transmission 9 is composed of a single planetary gear unit 6 and a dual planetary gear unit; the respective carriers CR of the planetary gear units 6,7 are coupled with respect to each other in an integrated body; the respective sun gears S of the planetary gear units 67, are integrally coupled with respect to each other; the input member 5 coupled with the turbine 26 of the torque converter 2 is coupled with the ring gear $R_1$ of the single planetary gear unit 6 through the first clutch $C_1$ and also is coupled with the sun gear S through the second clutch; the member interlocked with the impeller $2a$ of the torque converter 2 is coupled with the ring gear $R_2$ of the dual planetary gear unit 7 through the third clutch $C_0$; the sun gear S and the ring gear $R_2$ of the dual planetary gear unit are so designed that they can be locked as necessity requires; and the carrier CR is coupled with the output member 13 ( cf. FIG. 1 ).

What is claimed is:

1. An automatic transmission, comprising:
    a torque converter including an impeller having a connected member, a turbine having an input member and a reactor; and
    an automatic transmission mechanism having first to third clutches and plural gear units including a single planetary gear unit with a ring gear and a dual planetary gear unit with a ring gear, said single and dual planetary gear units having respective carriers integrally coupled with each other and respective sun gears integrally coupled with each other, said input member of said turbine being coupled with said ring gear of said single planetary gear unit through the first clutch, and being coupled with said sun gear through the second clutch, said connected member of said impeller being coupled with the ring gear of said dual planetary gear of said dual planetary gear unit being made to be and ring gear of said dual planetary gear unit being made to be restrained as required, and said carrier being coupled with an output member.

2. An automatic transmission according to claim 1, wherein said automatic transmission mechanism attains forward four speed stages;
    said first clutch being in connection during said forward one speed, two speed and three speed, and in cut-off during said forward four speed; and
    said third clutch being in connection during said forward three speed and four speed, and in cut-off during said forward one speed and two speed.

3. An automatic transmission comprising:
    a torque converter including an impeller having a connected member, a turbine having an input member and a reactor, said impeller being interlocked with an engine output shaft, and said turbine being interlocked with an input member of said automatic transmission mechanism, and
    an automatic transmission mechanism including a single planetary gear unit with a ring gear, a dual planetary gear unit with a ring gear, at least forward three speed stages, and at least a first clutch having an input side portion, a second clutch and a third clutch having an input side portion, said first and third clutches having multi-plates to be operated by a hydraulic servomechanism, said first clutch being in connection during said forward one, two and three speed and said third clutch being in connection during a high speed stage and in cut-off during said one speed and said two speed, said input side portion of said first clutch being coupled with the input member of said turbine and the input side portion of said third clutch being coupled with the connected member of said impeller, said single and dual planetary gear units having respective carriers integrally coupled with respect to each other, and respective sun gears integrally coupled with respect to each other, said input member of said turbine being coupled with the ring gear of said single planetary gear unit through said first clutch and the sun gears through the second clutch, said connected member of said impeller being coupled with the ring gear of said dual planetary gear unit through said third clutch, said ring gear and sun gear of said dual planetary gear unit being designed so that they can be locked as required, and said carriers being coupled with an output member.

4. An automatic transmission comprising:
a torque converter including an impeller having a connected member, a turbine having an input member and a reactor, said impeller being interlocked with an engine output shaft, and said turbine being interlocked with an input member of said automatic transmission mechanism; and an automatic transmission mechanism including a single planetary gear unit with a ring gear, a dual planetary gear unit with a ring gear, at least forward three speed stages, and at least a first clutch having an input side portion, a second clutch, and a third clutch having an input side portion, said first and third clutches having multi-plates to be operated by a hydraulic servomechanism, said first clutch being in connection during said forward one, two and three speed and said third clutch being in connection during a high speed stage and in cut-off during said one speed and said two speed, said input side portion of said first clutch being coupled with the input member of said turbine and the input side portion of said third clutch being coupled with the connected member of said impeller, said single and dual planetary gear units having respective carriers integrally coupled with respect to each other and sun gears, said respective ring gears of said both planetary gear units being integrally coupled with respect to each other, said input member of said turbine being coupled with the sun gear of said dual planetary gear unit through said first clutch, and being coupled with the sun gear of said single planetary gear unit through said second clutch, the connected member of said impeller being coupled with said carriers through said third clutch, said sun gear and the carrier of said single gear unit being designed so that they can be locked as required, and the ring gears being coupled with an output member.

* * * * *